(12) United States Patent
Lundstedt et al.

(10) Patent No.: US 11,698,041 B2
(45) Date of Patent: Jul. 11, 2023

(54) ON-BOARD DIAGNOSTICS OF A TURBOCHARGER SYSTEM

(71) Applicant: VOLVO TRUCK CORPORATION, Gothenburg (SE)

(72) Inventors: Björn Lundstedt, Lerum (SE); Marcus Olsen, Kungsbacka (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/981,413

(22) PCT Filed: Mar. 29, 2018

(86) PCT No.: PCT/EP2018/025079
§ 371 (c)(1),
(2) Date: Sep. 16, 2020

(87) PCT Pub. No.: WO2019/185107
PCT Pub. Date: Oct. 3, 2019

(65) Prior Publication Data
US 2021/0010438 A1  Jan. 14, 2021

(51) Int. Cl.
*F02D 41/22* (2006.01)
*F02B 21/00* (2006.01)
(Continued)

(52) U.S. Cl.
CPC .............. *F02D 41/22* (2013.01); *F02B 21/00* (2013.01); *F02B 29/02* (2013.01); *F02B 37/10* (2013.01);
(Continued)

(58) Field of Classification Search
CPC .. F02D 41/0007; F02D 41/22; F02D 41/1448; F02D 2200/0406;
(Continued)

(56) References Cited

U.S. PATENT DOCUMENTS 4,060,987 A * 12/1977 Fisch ....................... B60K 3/04
60/409
4,068,468 A * 1/1978 Wood .................... F01L 25/066
60/787
(Continued)

FOREIGN PATENT DOCUMENTS

CN       103003548 A       3/2013
CN       104653279 A       5/2015
(Continued)

OTHER PUBLICATIONS

International Search Report and Written Opinion dated Jan. 7, 2019 in corresponding International PCT Application No. PCT/EP2018/025079, 12 pages.

(Continued)

*Primary Examiner* — Gonzalo Laguarda
(74) *Attorney, Agent, or Firm* — Venable LLP; Jeffri A. Kaminski

(57) ABSTRACT

A turbocharger system (1) of a combustion engine (4) comprises a turbocharger turbine (5) operable by exhaust gases, a valve (7) configured to control gas flow of pressurized gas from a pressurized gas reservoir (6) to the turbocharger turbine (5), and a sensor (8). Turbocharger system operation comprises injecting a test pulse of pressurized gas from the pressurized gas reservoir (6) to drive the turbocharger turbine (5) by means of controlling the valve (7), detecting an impact of injected pressurized gas on the turbocharger turbine (5) by means of the sensor (8), collecting data from the sensor (8), and diagnosing the turbocharger system (1) by evaluating an operational response of the turbocharger turbine (5) as a result of the injected test pulse of pressurized gas, based on the collected data.

15 Claims, 5 Drawing Sheets

(51) Int. Cl.
*F02B 29/02* (2006.01)
*F02B 37/10* (2006.01)
*F02D 41/14* (2006.01)

(52) U.S. Cl.
CPC .. *F02D 41/1448* (2013.01); *F02D 2200/0406* (2013.01); *F02D 2200/0414* (2013.01)

(58) Field of Classification Search
CPC .. F02D 2200/0414; F02B 21/00; F02B 29/02; F02B 37/10
See application file for complete search history.

(56) References Cited

U.S. PATENT DOCUMENTS

| | | | |
|---|---|---|---|
| 5,064,423 A | | 11/1991 | Lorenz et al. |
| 7,964,787 B2* | | 6/2011 | Jaisinghani ............ H02S 10/10 |
| | | | 136/248 |
| 9,476,365 B2* | | 10/2016 | Rollinger ................ F02D 41/38 |
| 9,964,028 B2* | | 5/2018 | Almkvist ................ F02B 21/00 |
| 10,697,362 B2* | | 6/2020 | Smiljanovski .......... F02B 33/40 |
| 10,746,093 B2* | | 8/2020 | Dudar ..................... F02B 39/10 |
| 2005/0160733 A1 | | 7/2005 | Onodera et al. |
| 2011/0288715 A1 | | 11/2011 | Schaffeld et al. |
| 2011/0288730 A1 | | 11/2011 | Schaffeld et al. |
| 2011/0288741 A1 | | 11/2011 | Schaffeld et al. |
| 2012/0216531 A1 | | 8/2012 | Schaffeld et al. |
| 2012/0216532 A1 | | 8/2012 | Schaffeld et al. |
| 2013/0232972 A1 | | 9/2013 | Heiermann |
| 2013/0305714 A1 | | 11/2013 | Rollinger et al. |
| 2013/0305718 A1 | | 11/2013 | Rollinger et al. |
| 2014/0026538 A1 | | 1/2014 | Hauser et al. |
| 2017/0074183 A1 | | 3/2017 | Howard et al. |
| 2018/0274436 A1* | | 9/2018 | Kemmerling ......... F02B 37/013 |
| 2019/0170061 A1 | | 6/2019 | Dudar |

FOREIGN PATENT DOCUMENTS

| | | |
|---|---|---|
| CN | 105221246 A | 1/2016 |
| CN | 106168158 A | 11/2016 |
| CN | 106640394 A | 5/2017 |
| CN | 108625978 A | 10/2018 |
| DE | 102008000326 A1 | 8/2009 |
| DE | 102013208970 A1 | 11/2013 |
| EP | 2749751 A1 | 7/2014 |
| EP | 2759688 A2 | 7/2014 |

OTHER PUBLICATIONS

International Preliminary Report on Patentability dated Jul. 15, 2020 in corresponding International PCT Application No. PCT/EP2018/025079, 14 pages.
Chinese Office Action dated Mar. 25, 2022 in corresponding Chinese Patent Application No. 201880091971.8, 8 pages.

* cited by examiner

ON-BOARD DIAGNOSTICS OF A TURBOCHARGER SYSTEM

CROSS-REFERENCE TO RELATED APPLICATIONS

This application is a U.S. National Stage application of PCT/EP2018/025079, filed Mar. 29, 2018, and published on Oct. 3, 2019, as WO 2019/185107 A1, all of which is hereby incorporated by reference in its entirety.

TECHNICAL FIELD

The invention relates to a method for on-board diagnostics of a turbocharger system for a vehicle. The invention may be applied in heavy-duty vehicles, such as trucks, buses and construction equipment. Although the invention will be described with respect to a truck, the invention is not restricted to this particular vehicle but may also be used in other vehicles for which turbocharger systems may be used. The invention also relates to a turbocharger system comprising an on-board diagnostics unit.

The invention further relates to a computer program comprising program code means, a computer readable medium carrying such a computer program, a control unit and a vehicle comprising a turbocharger system.

BACKGROUND

It is well known that in order to improve performance of a combustion engine the combustion engine may be provided with a turbocharger. A turbocharger generally comprises a turbocharger turbine and a turbocharger compressor connected to each other by a turbine shaft. The combustion engine has an exhaust manifold and the turbocharger turbine is operable by exhaust gases from the exhaust manifold. During operation of the combustion engine exhaust gases from the exhaust manifold drives the turbocharger turbine, whereby the turbocharger turbine drives the turbocharger compressor via the turbine shaft. Upon activation of the turbocharger the turbocharger compressor supplies additional air from an air intake of the combustion engine whereby more fuel can be combusted and the combustion engine can deliver more power.

It is also known that in order to improve the response or reduce lag of a turbocharger of a turbocharger system the turbocharger system may further comprise a tank provided with compressed gas, wherein the compressed gas may be provided by a compressor. Compressed gas from the tank can be injected upstream of the turbocharger turbine to speed up the turbocharger turbine, and thereby improve response or reduce lag of the turbocharger. During operation, i.e. combustion of fuel in the combustion engine generating exhaust gas acting on the turbocharger turbine, the turbocharger normally speeds up in 1 to 5 seconds. The compressed gas is generally injected in a pulse being up to maximum 2 seconds long. The degree to which the turbocharger response can be improved is except for the characteristics of the injected pulse e.g. dependent on amount of compressed gas in the tank, the condition of components of the turbocharger system and ambient conditions. In order to utilize the turbocharger system optimally it is desirable to have control over as many parameters affecting the turbocharger system as possible. Acquiring control of such parameters should preferably not affect driveability, performance or be disturbing to vehicle occupants.

Thus, there is room for improvements.

SUMMARY

An object of the invention is to provide a method for on-board diagnostics of a turbocharger system enabling improved useability of the turbocharger system. An object is also to provide a turbocharger system configured to execute such a method.

According to a first aspect of the invention the object is achieved by a method for on-board diagnostics according to the independent method claim. More particularly the method evaluates an operational response of a turbocharger turbine of the turbocharger system as a result of an injected test pulse of pressurized gas. The operational response of the turbocharger turbine may be used to optimize operation of the turbocharger system.

According to a second aspect of the invention the object is achieved by a turbocharger system comprising an on-board diagnostics unit capable of performing the method for on-board diagnostics according to the invention.

Further advantages and advantageous features of the invention are disclosed in the following description and in the dependent claims.

Yet further objects of the invention is to provide a computer program comprising program code means configured to execute the method for on-board diagnostics, a computer readable medium carrying such a computer program, a control unit for controlling the method for on-board diagnostics and a vehicle comprising the turbocharger system according to the invention.

Thus, a first aspect of the invention relates to a method for on-board diagnostics of a turbocharger system for a vehicle. The turbocharger system is fluidly connected to an exhaust manifold of a combustion engine. The turbocharger system comprises a turbocharger turbine operable by exhaust gases from the exhaust manifold, a pressurized gas reservoir being fluidly connectable to the turbocharger turbine, a valve configured to control flow of pressurized gas from the pressurized gas reservoir to the turbocharger turbine and a sensor. The method comprises the steps of:

injecting a test pulse of pressurized gas from the pressurized gas reservoir to drive the turbocharger turbine by means of controlling the valve, detecting impact of injected pressurized gas on the turbocharger turbine by means of the sensor, collecting data from the sensor, and evaluating an operational response of the turbocharger turbine as a result of the injected test pulse of pressurized gas, based on the collected data.

An exemplary advantage of this aspect of the invention is that by injecting a test pulse and evaluate data collected the current condition of the turbocharger system, and components related thereto, can be evaluated. This information may subsequently be used by a control unit of the vehicle in order to optimize e.g. performance, energy consumption or driveability of the vehicle.

The turbocharger is operated by gases from the exhaust manifold acting on the turbocharger turbine. The turbocharger system is fluidly connected to the exhaust manifold of the combustion engine. The exhaust manifold is fluidly connected to an intake manifold of the combustion engine whereby the turbocharger system also is fluidly connected to the intake manifold. When herein referring to that the pressurized gas reservoir is fluidly connectable to the turbocharger turbine what is meant is that pressurized gas from the pressurized gas reservoir can be guided, e.g. by means of at least one conduit, from the pressurized gas reservoir such that it reaches the turbocharger turbine and may affect the turbocharger turbine. The pressurized gas reservoir may e.g. be connected, by means of a conduit, to the intake manifold or to the exhaust manifold of the combustion engine. The valve is arranged between the pressurized gas reservoir and the turbocharger turbine whereby by controlling the valve the flow of pressurized gas from the pressurized gas reservoir to the turbocharger turbine can be controlled. The valve, which may be an electromechanical valve, may be controlled by a control unit.

It should also be noted that when referring to that the pressurized gas from the pressurized gas reservoir drives up the turbocharger turbine this should be interpreted as that the pressurized gas rotates and/or speeds up the turbocharger turbine, or that the pressurized gas contributes to rotating/speeding up the turbocharger turbine, e.g. in combination with exhaust gas from the exhaust manifold.

At least one sensor is used to collect data that can be associated to the operation of the turbocharger turbine. As will be disclosed more in detail later in the following description the sensor may be at least one sensor of a number of possible types of sensors or a combination of different sensors.

When herein referring to that the vehicle, combustion engine or turbocharger system is in operation what is considered is that the vehicle is driving and the combustion engine and turbocharger system works as intended during driving of the vehicle.

According to the method a test pulse of pressurized gas from the pressurized gas reservoir is injected to drive the turbocharger turbine. The injection is controlled by means of the valve. At least one sensor is used to detect impact of injected pressurized gas on the turbocharger turbine and to collect data related thereto. The data collected is evaluated whereby an operational response of the turbocharger turbine can be evaluated. The operational response may e.g. be that the turbocharger is affected or not is affected by the injected pulse and/or may relate to the degree of response of the turbocharger turbine. It is possible to measure impact on the turbocharger turbine at various positions of the turbocharger system or at various positions being fluidly connected to the turbocharger turbine of the engine. Thus, it is not necessary that the data collected for evaluating the response of the turbocharger turbine is derived from a sensor which directly detects e.g. movements of the turbocharger turbine, such as e.g. a turbo speed sensor. The data may also be derived from a sensor which is configured to collect data for a parameter that indirectly affects or is affected by movement of the turbocharger turbine, such as e.g. a boost pressure sensor or a mass flow sensor. According to aspects of the invention such indirect sensor data may be correlated to the turbocharger turbine response by means of previously performed mapping or predetermined threshold values. Such correlation may e.g. be performed by the control unit.

The method of the invention, or any embodiments of the invention disclosed hereinafter, may be performed e.g. at vehicle start up, i.e. when the combustion engine is ignited or when the power in the vehicle is turned on, at predetermined points in time such as e.g. once every day or once every week, or at predetermined time intervals during operation of the vehicle such as e.g. hourly or every ten minutes.

According to an embodiment of the first aspect of the invention the test pulse is 0.01 to 0.3 seconds long, preferably is 0.05 to 0.2 seconds long and more preferably is 0.1 second long.

An exemplary advantage of this embodiment is that by setting the length of the test pulse to be short the current condition of the turbocharger system can be evaluated by using as small amount of pressurized gas from the pressurized gas reservoir as possible. Short is here referring to short in relation to the lengths of the pulses used when a pulse is injected in order to speed-up the turbocharger system during normal operation of the turbocharger system. Such pulses are generally between 0.3 and 1 seconds long, 2 seconds long at most. It is also desirable that the evaluation can be done without vehicle occupants noticing, or at least without disturbing vehicle occupants more than necessary. This is also accomplished by using as small amount of pressurized gas as possible injected during as short period of time as possible.

According to another embodiment, the step of evaluating the operational response of the turbocharger turbine comprises the further step of:

comparing the data collected after the test pulse has been injected to data collected before the test pulse is injected.

The data collected before the test pulse is injected is preferably data collected last time the method of the invention was performed. An exemplary advantage of this embodiment is that by comparing data collected before a test pulse is injected to data collected after the test pulse has been injected it is possible to evaluate the effects of other vehicle operations such as e.g. acceleration or increased EGR.

According to a further embodiment, the step of evaluating the operational response of the turbocharger turbine comprises the further step of:

assessing if the evaluated operational response of the turbocharger turbine indicates no response of the turbocharger turbine as the result of the injected test pulse, wherein if there is no response the method comprises the further steps of:

injecting a further pulse of pressurized gas from the pressurized gas reservoir to drive the turbocharger turbine, wherein the further pulse is longer than a previous pulse, detecting impact of injected pressurized gas on the turbocharger turbine by means of the sensor, collecting data from the sensor, and evaluating the operational response of the turbocharger turbine as a result of the injected further pulse of pressurized gas based on the collected data, wherein the further steps of the method are repeated until the evaluated operational response of the turbocharger turbine indicates response of the turbocharger turbine as the result of the injected further pulse.

As previously stated, a possible operational response of the turbocharger turbine is no operational response. The test pulse injected may e.g. be too short, i.e. lead to that a too small amount of pressurized gas is injected, to result in any measurable response of the turbocharger turbine. According to this embodiment if it is assessed that the evaluation of the operational response provides no operational response the method is repeated, but this time a further pulse is injected. The further pulse is longer than the previously injected test pulse. Longer is here defined as that the valve is open for a longer period of time whereby a larger amount of pressurized gas from the pressurized gas reservoir is injected. The method is subsequently repeated, i.e. if not injection of the further pulse results in a response of the turbocharger turbine, a yet further pulse is injected. The yet further pulse is longer than the previous further pulse. The method is subsequently repeated until a response is obtained or the method is terminated due to that a method termination condition is fulfilled.

Examples of method termination conditions are that a predefined maximum pulse length is reached, such as e.g. that the pulse injected is over 1 second long, that the pulse length is limited by pressurized gas reservoir volume or an embodiment of the method according to the invention indicates turbocharger system failure.

According to another embodiment each further pulse is between 0.05 and 0.15 seconds longer than the previous pulse, preferably between 0.05 and 0.1 seconds longer and more preferably 0.05 seconds longer than the previous pulse. According to yet further embodiments algorithms can be used to find the required pulse length with a minimum number of further test pulses.

As previously stated, it is desirable that the test pulse and the further pulses used to evaluate the system are as short as possible in order to not disturb the vehicle occupants more than necessary and in order to waste as small amount of pressurized gas as possible. A long pulse, with clear measurable response on the turbocharger turbine, has the drawbacks of excessive pressurized gas consumption, impact on noise and also requires the turbocharger to speed down fully before next test pulse can be injected. Thus, an exemplary advantage of this embodiment is that by gradually increasing the length of the further pulse, starting from a relatively short pulse length and where each increase also is relatively moderate in terms of pulse length, it is ensured that the shortest pulse possible, which still provides response, is used to evaluate the turbocharger system.

Use of mechanical, pneumatic and electrical components, such as e.g. actuators and relays, of a system inherently entails a certain delay from that a control unit of the system initiates an operation to that the operation is executed. This delay is herein referred to as inherent system delay. The inherent system delay for the turbocharger system of the invention is approximately 0.05 to 0.1 seconds amongst others due to the opening time of the electromechanical valve. In addition to inherent system delay the operation in itself may entail a certain delay. If e.g. pressurized gas is added to a system it generally takes some time before the result is measurable by means of sensors. The time before any results are measurable is obviously dependent on what is measured and where the respective sensor is positioned.

Herein a delay time is defined as the maximum time it takes from that a control unit of the turbocharger system activates the step of injecting the test or further pulse to that the step of injecting the test or further pulse is de-activated without a measurable response. I.e. the shortest time the valve can be controlled from fully closed, to fully opened and back to fully closed without that the pressurized gas potentially released from the pressurized gas reservoir affects the turbocharger turbine in a measureable way. Thus, the time to the actual response of the turbocharger turbine is not directly related to the delay time. In more general terms delay time is defined as the maximum pulse time without measurable response.

For further clarification we consider the following example wherein the length of a test pulse or further pulse is determined by the time between a control unit activates the step of injecting the test pulse or further to that the step of injecting the test pulse is de-activated;

an 0.2 seconds long test pulse is injected;
result: none of the sensors of the engine and/or turbocharger system capable of directly or indirectly detecting impact on the turbocharger turbine indicates any turbocharger response,
an 0.25 seconds long further pulse is injected;
result: 0.5 seconds later e.g. a turbo speed sensor indicates turbocharger turbine speed-up.

For this example the delay time will be 0.2 seconds, i.e. the maximum time, given the current resolution/accuracy, it takes from that a control unit of the turbocharger system activates the step of injecting the test pulse to that the step of injecting the test pulse is de-activated without a measurable response.

Thus, according to one embodiment, the method comprises the further step of:
determining a current delay time,
wherein delay time is defined as the maximum time from activating the step of injecting the test pulse or further pulse to de-activating the step of injecting the test pulse or further pulse without measurable response.

Thus, the current delay time is determined by performing a number of tests by injecting a test pulse and further test pulses. The pulses may have different pulse length, preferably starting from a relatively short test pulse and successively increasing the pulse length of the subsequent further test pulses.

An exemplary advantage of this embodiment is that identifying the delay time provides improved understanding of the turbocharger system e.g. in respect to system performance at current environmental conditions and at current level of wear of system components. This embodiment provides valuable information in order for the control unit to be able to optimize system operation according to prevailing system condition.

When herein referring to valve what is considered is a valve of on-off type. It is however also possible to use a continuously controlled valve, which can be controlled to be between 0% and 100% open. When using a continuously controlled valve the delay time is defined as starting when the valve is open >0%.

According to yet one embodiment, the method comprises the further steps of, when a current delay time has been determined:
injecting a control pulse of pressurized gas from the pressurized gas reservoir to drive the turbocharger turbine, wherein the control pulse is longer than the current delay time,
detecting impact of injected pressurized gas on the turbocharger turbine by means of the sensor,
collecting data from the sensor, and
evaluating if the operational response as a result of the injected control pulse indicates that the turbocharger system operates as expected.

The control pulse is longer than the current delay time. Thereby it is assured that the control pulse provides, provided that the system operates as intended, a measurable turbocharger turbine response. An exemplary advantage of this embodiment is that by injecting a control pulse and comparing collected data recorded after the control pulse has been injected to data collected before the control pulse is injected it can be assessed whether the turbocharger system operates as expected. The mass flow of pressurized gas from the pressurized gas reservoir when the valve is opened is amongst others dependent on the current gas pressure of the gas reservoir. However, even though the valve opening time thereby is not directly proportional to the mass flow of injected gas it can still be detected if a pulse of a certain length gives the expected response in terms of e.g. turbo speed increase. Depending on which sensors that are used, and what data collected by such sensors that are compared, this embodiment can be used to analyse that various engine and/or turbocharger components works satisfactorily.

According to another embodiment, the method comprises the further step of:
storing current delay time as a stored system delay time, whereby stored system delay time is used to optimize operation of the turbocharger system.

Storing current delay times may be useful in order to be able to track operations and performance of the turbocharger system over time. Thus, an exemplary advantage of this embodiment is that wear of a component can be tracked over time whereby component failure may be predicted.

According to yet another embodiment, the method comprises the further step of:
correlating and storing the stored system delay time together with additional operating and/or environmental parameters.

Other operating parameters may e.g. be gas pressure in the pressurized gas reservoir, the valve individual, the general type of valve, valve temperature, time passed since last turbocharger system evaluation, current turbo speed and/or engine response/output requested by a human driver or an autonomous driving system. Environmental parameters may e.g. be current ambient temperature and/or current ambient pressure. With correlating is here considered that a delay time is stored together with, i.e. correlated with, other parameters defining environmental conditions and/or vehicle conditions at the time the delay time is determined.

An exemplary advantage of this embodiment is that this provides multi-dimensional operating history relating to system delay which may be used e.g. for improved system optimization and system analysis. It may e.g. be possible to explain unexpected engine and/or turbocharger system behaviours and to predict future system behaviour. Such information may also be valuable for future development work.

An autonomous driving system may be controlled by a separate control unit or by a separate unit or functionality of a control unit also controlling other functionalities of the vehicle. Thereby engine response/output can also be considered to be requested by a control unit controlling an autonomous driving system.

According to yet another embodiment, the method comprises the further step of:
collecting data regarding ambient temperature by means of an ambient temperature sensor, wherein if the ambient temperature is equal to or below 0 degrees Celsius, the method comprises the further step of:
determining that there is risk of freezing.

Vehicles of today are generally equipped with ambient temperature sensors, e.g. for providing a human driver, an autonomous driving system and/or a control unit with information regarding the temperature outside of the vehicle. Knowing the ambient temperature may be advantageous for a number of reasons. It may e.g. be advantageous to know that there is a risk that conduits of the turbocharger system may freeze. It may also be advantageous to know if the ambient temperature is below 0 degrees Celsius in order to interpret and/or predict turbocharger system behaviour.

According to yet another embodiment, the method comprises that if it has been determined that there is risk of freezing the method comprises the further steps of:
injecting a test pulse being equal to or longer than a predicted turbocharger start-up pulse, and
evaluating the operational response of the turbocharger turbine as a result of the injected test pulse, wherein if there is no operational response the method comprises the further step of:
determining that the turbocharger system is frozen.

Thus, if it is expected that the system may be frozen, which may be a risk if the ambient temperature is below or just around 0 degrees Celsius, a pulse is injected which is guaranteed to give turbocharger turbine response. If no response is detected it is determined that the system is frozen.

The predicted turbocharger start-up pulse is determined to be sufficiently long to make sure that if the turbocharger system works as expected a measurable response is obtained. The predicted turbocharger start-up pulse may e.g. be the delay time +0.1 to 0.5 seconds, e.g. delay time +0.3 seconds. The delay time is here obtained from last time the method of the invention was executed.

An exemplary advantage of this embodiment is that the system is actively tested before being used during operation. If an operational response indicating no turbocharger turbine response is detected it can be determined that the system is frozen. If the system is frozen it may damage the turbocharger system, or the components involved, if the turbocharger system still is used. It is also important that the control unit is aware of if the turbocharger system currently is not operational. Since a not operational turbocharger system affects the vehicle performance it may also be important that a human driver or an autonomous driving system is informed thereof. When the turbocharger system is operational again may e.g. be determined by that the combustion engine should be running continuously during a predefined period of time, that engine temperature sensors indicate a certain temperature or that a subsequent execution of the method indicates no freeze of the system.

The embodiments of methods according to the invention relating to either determining that there is risk of freezing or determining that the system is frozen are preferably performed before vehicle take off, e.g. at ignition of the combustion engine or when the power in the vehicle is turned on. If it is determined that the system is frozen a method of the invention verifying turbocharger system operation status is preferably performed. The method may be performed after the combustion engine has been running a predetermined period of time, e.g. for 5 minutes, or when a vehicle temperature sensor indicates a predetermined temperature increase.

According to one embodiment the method for on-board diagnostics is performed when the combustion engine is in operation. An exemplary advantage of this embodiment is that it is easier to mask execution of the method without the vehicle occupants noticing. It is also advantageous to be able to execute the method during operation whereby operation and performance of the turbocharger system can be optimized continuously. According to another embodiment the method for on-board diagnostics is performed when the combustion engine is not in operation. An exemplary advantage of this embodiment is that when not in operation, i.e. when there probably are no vehicle occupants, there are no one that can be disturbed by the method being executed. According to yet another embodiment the method for on-board diagnostics is performed when the combustion engine is idling. An exemplary advantage of this embodiment, in comparison to when executing the method during vehicle operation, is that it may be easier to detect an operational response indicating response of the turbocharger turbine when the vehicle is in idle than when in operation. When the vehicle is in operation, especially during transient driving, it may be difficult to detect operational response of the turbocharger turbine. This is particularly true if the sensor used for collecting data to be evaluated is strongly affected by transient driving, such as when a human driver or an autonomous driving system requests increased engine output, in combination with that other parameters used by the engine control unit is changing. An example may be rapid change of the amount of injected fuel per fuel injection in combination with irregular EGR.

According to another embodiment the method steps are performed by a control unit. The control unit may be one single control unit or a number of control units interconnected and collaborating in a distributed network forming a distributed control unit.

Another aspect of the invention refers to a turbocharger system for use together with a combustion engine having an exhaust manifold. The turbocharger system comprises:
 a turbocharger turbine operable by exhaust gases from the exhaust manifold,
 a pressurized gas reservoir being fluidly connectable to the turbocharger turbine,
 a valve configured to control flow of pressurized gas from the pressurized gas reservoir to the turbocharger turbine,
 a sensor detecting impact of injected pressurized gas on the turbocharger turbine, and
 a control unit arranged to control the valve.

The control unit comprises an on-board diagnostics unit configured to control the operations of:
 inject a test pulse of pressurized gas from the pressurized gas reservoir to drive the turbocharger turbine by means of control of the valve,
 detect impact of injected pressurized gas on the turbocharger turbine by means of the sensor,
 collect data from the sensor, and
 evaluate an operational response of the turbocharger turbine as a result of the injected test pulse of pressurized gas, based on the collected data.

The on-board diagnostics unit do not have to be a separate unit but may very well be a separate functionality of the control unit configured to control and execute the steps of any method, or a combination of methods, referred to above. A turbocharger system according to this aspect of the invention has the exemplary advantage that it is capable of performing any one of, or a combination of, the embodiments of the method for on-board diagnostics disclosed herein.

According to one embodiment the pressurized gas reservoir is connected to the exhaust manifold or to an intake manifold, wherein the intake manifold is fluidly connected to the exhaust manifold of the combustion engine. Thereby pressurized gas from the pressurized gas reservoir is injectable to the exhaust manifold or to the intake manifold of the combustion engine. The pulse injected may e.g. be a test pulse, a further pulse or a control pulse.

According to another embodiment the sensor capable of detecting impact of injecting pressurized gas is a turbo speed sensor and/or a boost pressure sensor and/or an exhaust manifold pressure sensor and/or a mass flow sensor and/or an oxygen sensor. It is also possible to combine data from any of the above mentioned sensors with data from e.g. a pressurized gas reservoir pressure sensor and/or an ambient temperature sensor and/or a temperature sensor measuring temperature of an engine component.

An advantage with using a turbo speed sensor is that according to certain embodiments it is the most sensitive sensor for detecting impact of injected pressurized gas on the turbocharger turbine. Thereby it may be possible that a smaller amount of pressurized gas, i.e. least risk of that the execution of the method is noticed by the driver, have to be used in relation to using other sensors. Almost all compression ignited engine vehicles are equipped with a boost pressure sensor, whereby using a boost pressure sensor may be preferable for compression ignited engine vehicles. If a compression ignited engine vehicle is not equipped with boost pressure sensor it may instead be equipped with a mass flow sensor, whereby using a mass flow sensor may be preferable.

It is also possible to combine data from at least two sensors for a more accurate evaluation of impact of injected pressurized gas and/or detection of system malfunction.

Combining data from at least two sensors may e.g. be important when evaluating impact of injected pressurized gas during transient driving. Transient driving is herein considered to be when increased output of the engine is requested, e.g. when driving up a steep inclination or during take-over. If only data from one sensor is used during transient driving the impact of injected pressurized gas may be difficult to detect. E.g. just detecting an increase in pressure in the exhaust manifold may be due to injection of pressurized gas, such as pressurized air, or due to that the driver requests increased engine output. However, if detecting pressure increase is combined with data from an oxygen sensor measuring oxygen level in the exhaust manifold, or any component fluidly connected thereto, a pressure increase due to injection of pressurized air can be distinguished from that the driver requests increased engine output. Combination of data from various sensors may also enable detection of malfunction of various engine components. A steady decrease in pressure in the pressurized gas reservoir after the method of the invention has been executed, possibly without detecting an impact on the turbocharger turbine, may indicate that the valve is not fully closed or leakage in the system. If the gas pressure in the reservoir for pressurized gas is not affected when the method step of injecting the test pulse or further pulse is activated this may indicate that the valve is not working.

According to one embodiment the pressurized gas reservoir is a tank configured for holding pressurized gas. According to another embodiment the pressurized gas reservoir is a pneumatic system of the vehicle. An exemplary advantage of having a separate tank is that the operation of the turbocharger system is not dependent on operation of other functionalities relying on pressurized gas. An exemplary advantage of having the pressurized gas reservoir as a part of a pneumatic system of the vehicle, which e.g. may be used for vehicle suspension, is that no separate pressurized gas system is required.

The invention also relates to a turbocharger system configured to execute the method steps of any embodiment, or a combination of embodiments, of the methods disclosed herein, and to a turbocharger system comprising a control unit. The control unit may be a vehicle control unit or be connected to a vehicle control unit.

An exemplary advantage of this aspect of the invention is that by having a control unit being the vehicle control unit, or being connected to the vehicle control unit, no separate sensors are required for enabling the methods of the invention to be performed but the standard vehicle sensors can be used.

The development of autonomous driving systems and technology related thereto goes incredibly fast and in a few years' time autonomously driven vehicles will most certainly be a common sight on our roads. Thus, when herein referring to driver this should not be interpreted as being limited to only human drivers but also autonomous driving systems are considered. Autonomous driving systems are generally controlled by a control unit of the vehicle.

The invention further relates to a computer program comprising program code means for performing the steps of any of the herein disclosed methods for on-board diagnostics when said program is run on a computer, to a computer readable medium carrying such a computer program and to a control unit for controlling any of the herein disclosed methods for on-board diagnostics.

The invention further relates to a vehicle comprising a turbocharger system according to any embodiment, or a combination of embodiments, disclosed herein.

Further advantages and advantageous features of the invention are disclosed in the following description and in the dependent claims.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles and exemplary embodiments of realizing or controlling operation of the invention. However, the invention should be regarded as illustrative rather than restrictive, and not as being limited to the particular examples discussed above. The different features of the various examples of the invention can be combined in other combinations than those explicitly described. It should therefore be appreciated that variations may be made in those examples by those skilled in the art without departing from the scope of the present invention as defined by the following claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The following description of exemplary embodiments of the invention is presented only for purposes of illustration and should not be seen as limiting. The description is not intended to be exhaustive and modifications and variations are possible in the light of the above teachings, or may be acquired from practice of various alternative embodiments of the invention. The exemplary embodiments discussed herein were chosen and described in order to explain the principles and the nature of various embodiments and its practical application to enable one skilled in the art to utilize the exemplary embodiments in various manners, and with various modifications, as are suited to the particular use contemplated. It should be appreciated that the aspects presented herein separately may be practiced in any combination with each other unless otherwise explicitly is stated.

Reoccurring reference signs refer to corresponding elements throughout the detailed description. When herein using reference signs indexed with a letter what is referred to is an exemplary embodiment of a feature that may be realized in different ways.

Figure 1:
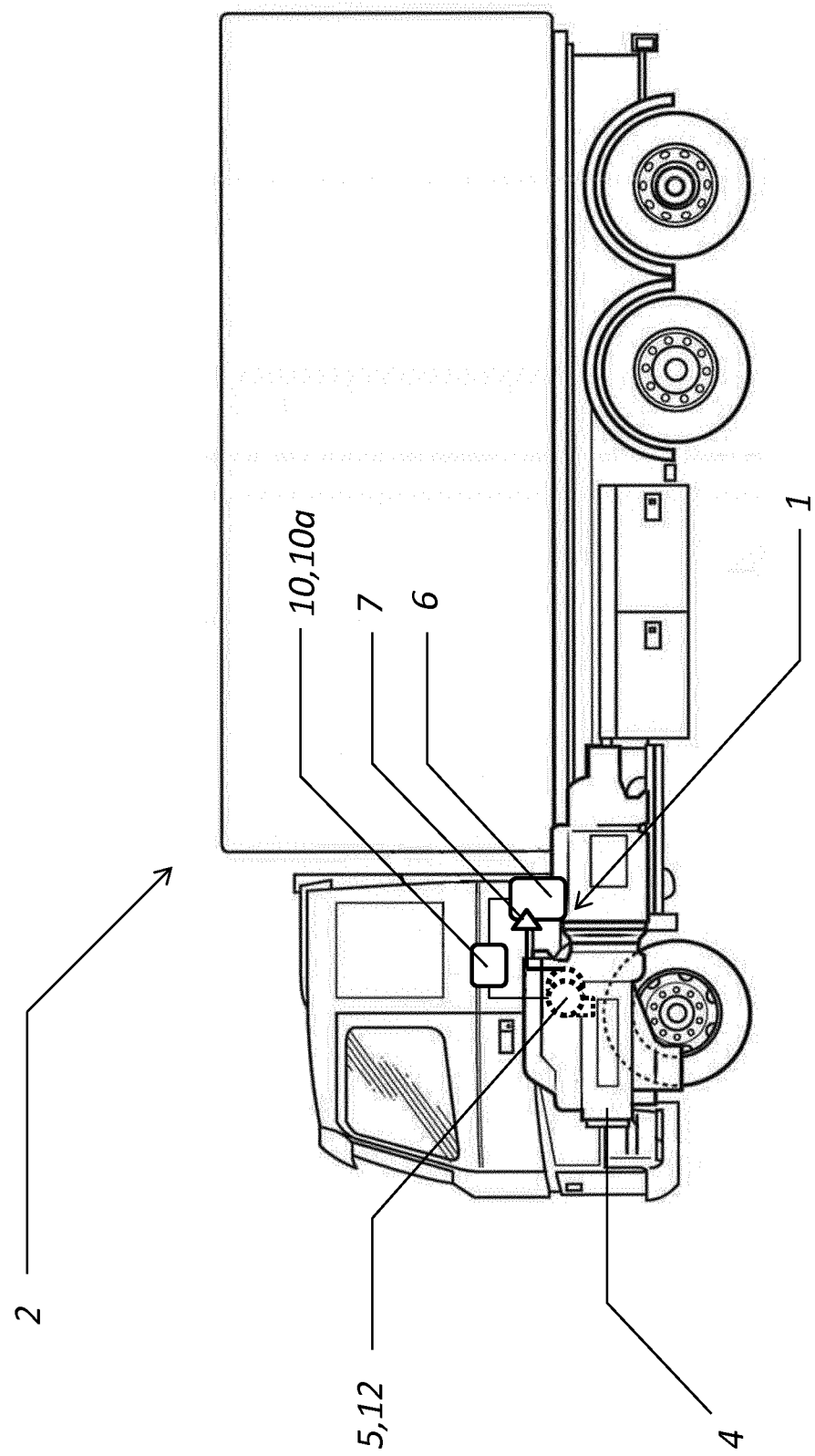
FIG. 1 shows a schematic side view of a vehicle comprising a combustion engine and an exemplary embodiment of a turbocharger system according to the invention.

FIG. 1 shows a schematic side view of a vehicle 2 comprising a combustion engine 4 and an exemplary embodiment of a turbocharger system 1 according to the invention. The combustion engine 4 comprises the turbocharger system 1, which in turn comprises a turbocharger 12, a pressurized gas reservoir 6, a valve 7 and a control unit 10. In FIG. 1 the control unit 10 comprises an on-board diagnostics unit 10a, i.e. the on-board diagnostics unit 10a is an integrated part or functionality of the control unit 10. The turbocharger 12 comprises a turbocharger turbine 5. The combustion engine 4 is fluidly connected to the turbocharger system 1 and to the turbocharger 12. The control unit 10 is configured to at least control the valve 7 which in turn controls the flow of pressurized gas from the pressurized gas reservoir 6 to the combustion engine 4.

Figure 2:
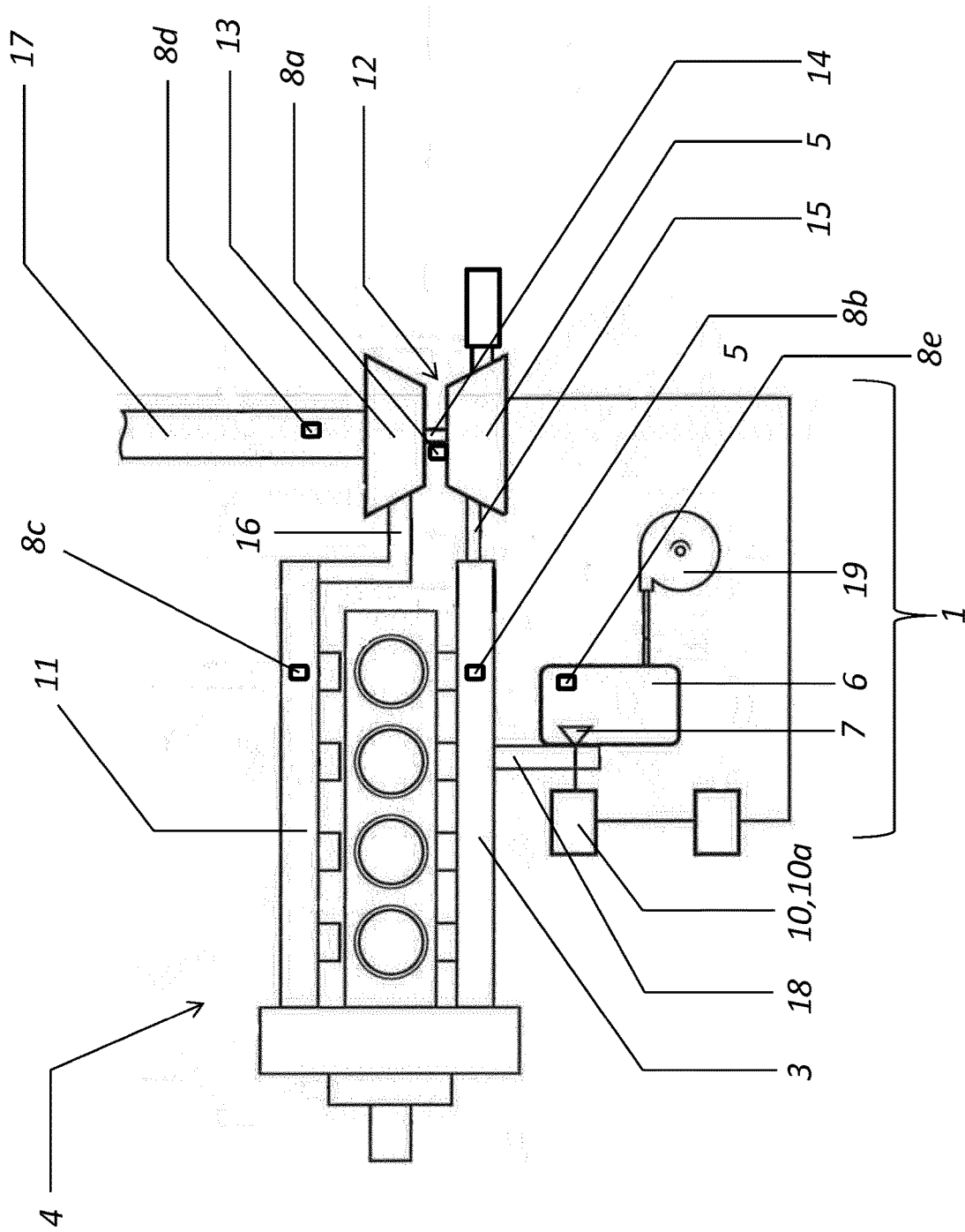
FIG. 2 shows a schematic view of a combustion engine comprising an exemplary embodiment of a turbocharger system according to the invention.

In addition to the components explicitly mentioned in relation to FIG. 1 the vehicle 2, the combustion engine 4 and the turbocharger system 1 obviously comprise a large number of additional components, of which the most important components for understanding the invention will be disclosed in relation to FIG. 2.

FIG. 2 shows a schematic view of at least parts of a combustion engine 4 comprising an exemplary embodiment of a turbocharger system 1 according to the invention. The turbocharger system 1 is configured to be used together with the combustion engine 4. The turbocharger system 1 comprises a turbocharger turbine 5 and a turbocharger compressor 13. The turbocharger compressor 13 is fluidly connected to an inlet manifold 11 by means of an inlet manifold conduit 16 and to an air inlet 17 configured to receive outside air. The turbocharger turbine 5 is connected to the turbocharger compressor 13 by means of a turbine shaft 14. The turbocharger turbine 5 is configured to drive the turbocharger compressor 13 via the turbine shaft 14. The combustion engine has an exhaust manifold 3 and the turbocharger turbine 5 is fluidly connected to the exhaust manifold 3 by means of an exhaust manifold conduit 15. The turbocharger turbine 5 is operable by exhaust gases from the exhaust manifold 3. During operation of the combustion engine 4 the turbocharger 5 is driven by exhaust gases generated by fuel combustion. The turbocharger turbine 5 in turn drives the turbocharger compressor 13 via the turbine shaft 14, whereby the turbocharger compressor 13 may supply additional outside air from the air inlet 17 to the intake manifold 11 via the intake manifold conduit 16. By increasing the amount of air supplied to the combustion engine 4 even more fuel can be combusted whereby the combustion engine 4 can deliver more output power.

The turbocharger system 1 further comprises a pressurized gas reservoir 6, being fluidly connectable to the turbocharger turbine 4, a valve 7, configured to control flow of pressurized gas from the pressurized gas reservoir 6 to the turbocharger turbine 5, at least one sensor 8 detecting impact of injected pressurized gas on the turbocharger turbine 5, and a control unit 10 arranged to control the valve 7. For the embodiment of the invention disclosed in FIG. 2 the control unit 10 comprises an on-board diagnostics unit 10a, i.e. the on-board diagnostics unit 10a is an integrated part or functionality of the control unit 10. In FIG. 2 the pressurized gas reservoir 6 is connected to the exhaust manifold 3 by means of a pressurized gas conduit 18. The pressurized gas reservoir 6 is also connected to a compressor 19 configured to supply pressurized gas to the pressurized gas reservoir 6. The compressor may be a compressor only used by the turbocharger system 1 or any other compressor or device of the vehicle 2 capable of providing pressurized gas.

As shown in the exemplary embodiment of FIG. 2, the on-board diagnostics unit may be, but is not limited to be, a separate unit, but may very well be a separate functionality of the control unit. The control unit 10 may also control other components and functionalities of the combustion engine 4 and/or turbocharger system 1, such as e.g. the compressor 19, in addition to what explicitly is disclosed herein.

According to the invention the pressurized gas reservoir 6 is connected to the exhaust manifold 3 or to the intake manifold 11. The intake manifold 11 is fluidly connected to the exhaust manifold 3 of the combustion engine 4. Pressurized gas from the pressurized gas reservoir 6 is injectable to the exhaust manifold 3 or to the intake manifold 11 of the combustion engine 4 during injection of a pulse. According to the exemplary embodiment of FIG. 2 the pressurized gas reservoir 6 is connected to the exhaust manifold 3. The sensor 8 is a sensor capable of detecting impact of injecting pressurized gas and may for example be a turbo speed sensor 8a and/or a boost pressure sensor 8c and/or an exhaust manifold pressure sensor 8b and/or a mass flow sensor 8d and/or an oxygen sensor 8e. When herein referring to sensor 8 also a combination of more than one sensor is considered to be an option. The sensor 8 may e.g. comprise a boost pressure sensor 8d and an oxygen sensor 8e. The exemplary positioning of the sensors 8 of FIG. 2 are not to be seen as limiting. As is apparent for a person skilled in the art, the respective sensor 8 may also be positioned differently.

The control unit 10 is configured to control and perform the steps of any embodiment of the method according to the invention. Thereby the control unit 10 is configured to at least perform the steps of;
inject a test pulse of pressurized gas from the pressurized gas reservoir 6 to drive the turbocharger turbine 5 by means of control of the valve 7,
detect impact of injected pressurized gas on the turbocharger turbine 5 by means of the sensor 8,
collect data from the sensor 8, and
evaluate an operational response of the turbocharger turbine 5 as a result of the injected test pulse of pressurized gas, based on the collected data. Exemplary embodiments of methods according to the invention will be disclosed in relation to FIG. 3 to 5.

In addition to the components explicitly mentioned in relation to FIG. 2 the combustion engine 4 and the turbocharger system 1 may obviously comprise a large number of additional components.

The reference numerals of FIG. 1 and FIG. 3 will hereinafter also be used when discussing the exemplary embodiments of methods according to the invention disclosed in the flow charts of FIG. 3 to 5.

Figure 3:
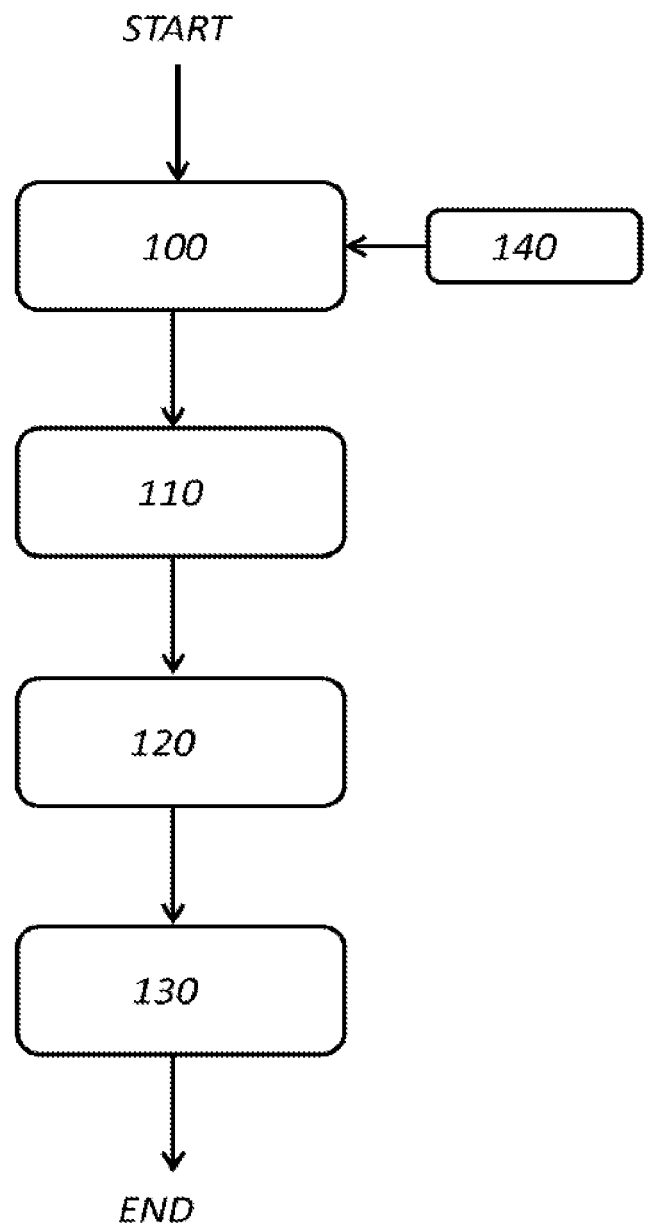
FIG. 3 shows a flow chart disclosing the steps performed when executing an exemplary embodiment of a method for on-board diagnostics of a turbocharger system according to the invention.

FIG. 3 shows a flow chart disclosing the steps performed when executing an exemplary embodiment of a method for on-board diagnostics according to the invention. The different steps of the method are visualized by boxes in the flow chart. The method comprises the steps of:
100 injecting a test pulse of pressurized gas from the pressurized gas reservoir 6 to drive the turbocharger turbine 5 by means of controlling the valve 7,
110 detecting impact of injected pressurized gas on the turbocharger turbine 5 by means of the sensor 8,
120 collecting data from the sensor 8, and
130 evaluating an operational response of the turbocharger turbine 5 as a result of the injected test pulse of pressurized gas, based on the collected data.

The method step of 100 injecting a test pulse is performed by means of 140 input of characteristics of a test pulse. According to exemplary embodiments of the invention the test pulse is 0.01 to 0.3 seconds long, preferably is 0.05 to 0.2 seconds long and more preferably is 0.1 second long. This is short pulses in relation to the pulses used during normal operation of the turbocharger system, i.e. when the system is used to improve turbocharger 12 response by means of pressurized gas. The method may be performed when the combustion engine 4 is in operation or when the combustion engine 4 is not in operation. The method steps are performed by means of a control unit 10.

According to embodiments of the invention the step of 130 evaluating the operational response of the turbocharger turbine 5 may further comprise comparing the data collected after the test pulse has been injected to data collected before the test pulse is injected.

By injecting a test pulse which is relatively short in comparison to the pulses used during normal operation of the turbocharger system 1, and collecting and evaluating data provided by such injection, it is possible to gain important information of the functionality of the system without wasting an excessive amount of compressed gas and without disturbing the driver more than necessary.

Figure 4:
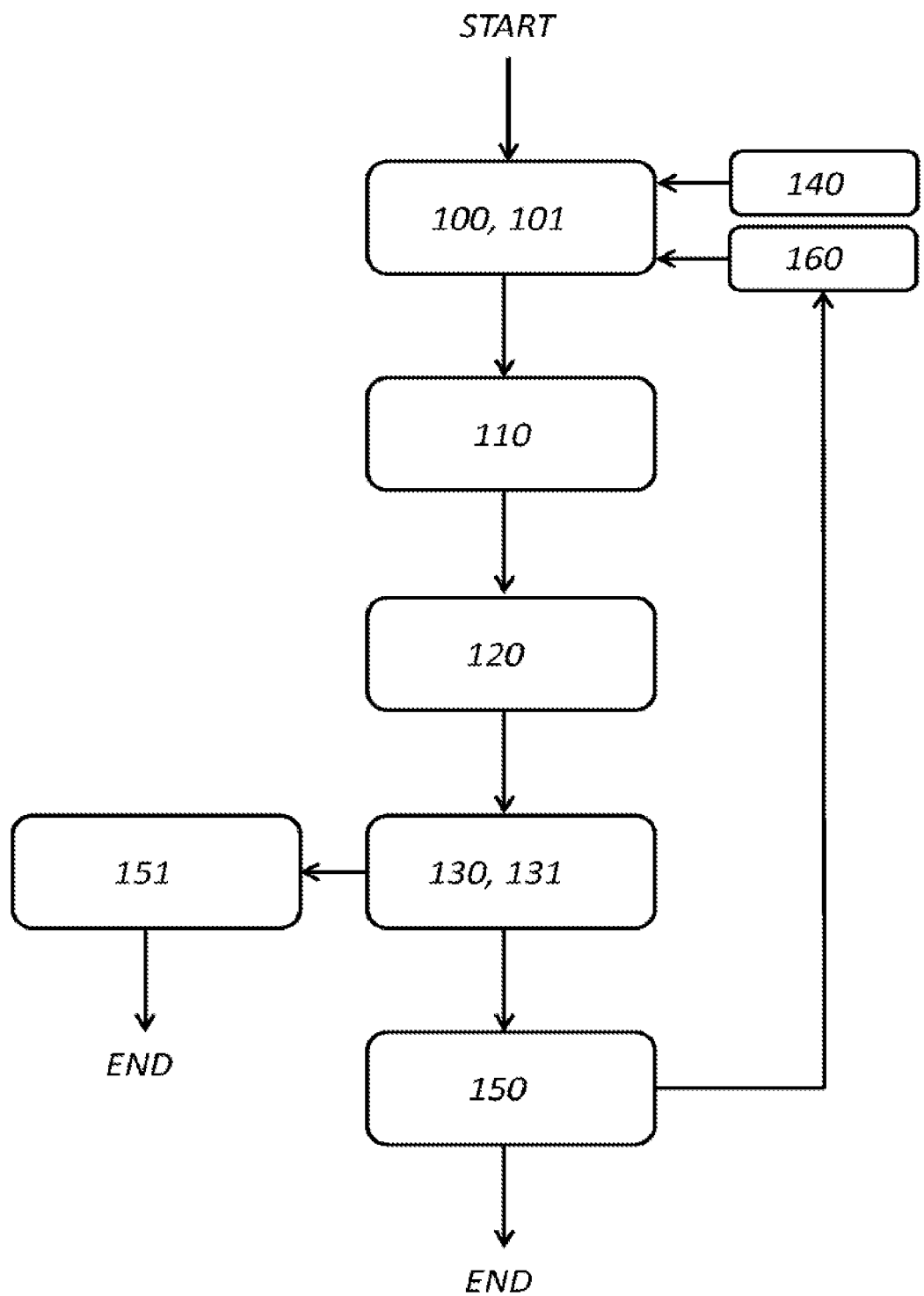
FIG. 4 shows a flow chart disclosing the steps performed when executing another exemplary embodiment of a method for on-board diagnostics of a turbocharger system according to the invention.

FIG. 4 shows a flow chart disclosing the steps performed when executing another exemplary embodiment of a method for on-board diagnostics according to the invention. The different steps of the method are visualized by boxes in the flow chart. In addition to the method steps disclosed in relation to FIG. 3 the exemplary embodiment of FIG. 4 comprises the further step of:
150 assessing if the evaluated operational response of the turbocharger turbine 5 indicates no response of the turbocharger turbine 5 as the result of the injected test pulse.

If the operational response of the turbocharger turbine 5 shows no response this may be an indication of that the injected test pulse was too short in order to provide a measurable response of the turbocharger turbine 5. Thereby it can be determined that in order for the turbocharger turbine 5 to respond the pulse needs to be longer or that the turbocharger system is not working properly. Thus, according to the exemplary embodiment if there is no response the method comprises the further steps of:

101 injecting a further pulse of pressurized gas from the pressurized gas reservoir 6 to drive the turbocharger turbine 5,
110 detecting impact of injected pressurized gas on the turbocharger turbine 5 by means of the sensor 8,
120 collecting data from the sensor 8, and
131 evaluating the operational response of the turbocharger turbine 5 as a result of the injected further pulse of pressurized gas based on the collected data,
wherein the further steps of the method 101, 110, 120, 131, 150 are repeated until the method step of 131 evaluating the operational response indicates response of the turbocharger turbine 5 as the result of the injected further pulse. The method step of 101 injecting the further pulse is performed by means of 160 input of characteristics of a further pulse.

By means of the method the shortest pulse possible providing turbocharger turbine 5 response can be used when testing the turbocharger system 1. As short pulse as possible is desirable since less pressurized gas is wasted. A long pulse is also more disturbing for the driver and requires the turbocharger 12 to speed down fully before next test pulse can be injected.

According to further embodiments of the invention each further pulse is between 0.05 and 0.15 seconds longer than the previous pulse, preferably between 0.05 and 0.1 seconds longer and more preferably 0.05 seconds longer than the previous pulse. According to other embodiments of the invention the further pulses are successively longer than the previous pulse.

According to embodiments of the invention, when the step of 131 evaluating an operational response of the turbocharger turbine 5 indicates response of the turbocharger turbine 5 the method may further comprise the step of:
151 determining a current delay time.

Delay time is herein defined as the maximum time from activating the step of injecting the test pulse or further pulse to de-activating the step of injecting the test pulse or further pulse without measurable response, i.e. delay time is defined as the maximum pulse time without measurable response.

Determining the delay time is advantageous since knowing the turbocharger system 1 delay time enables improved useability of the combustion engine 4 and the turbocharger system 1. By knowing the delay time the control unit 10 is capable of better assessing when and how pressurized gas should be injected, for example in order to fulfil engine output demands of the driver during acceleration. Thereby improved driveability of the vehicle 2 can be achieved. Thus, delay time is an important input parameter for the control unit 10.

Figure 5:
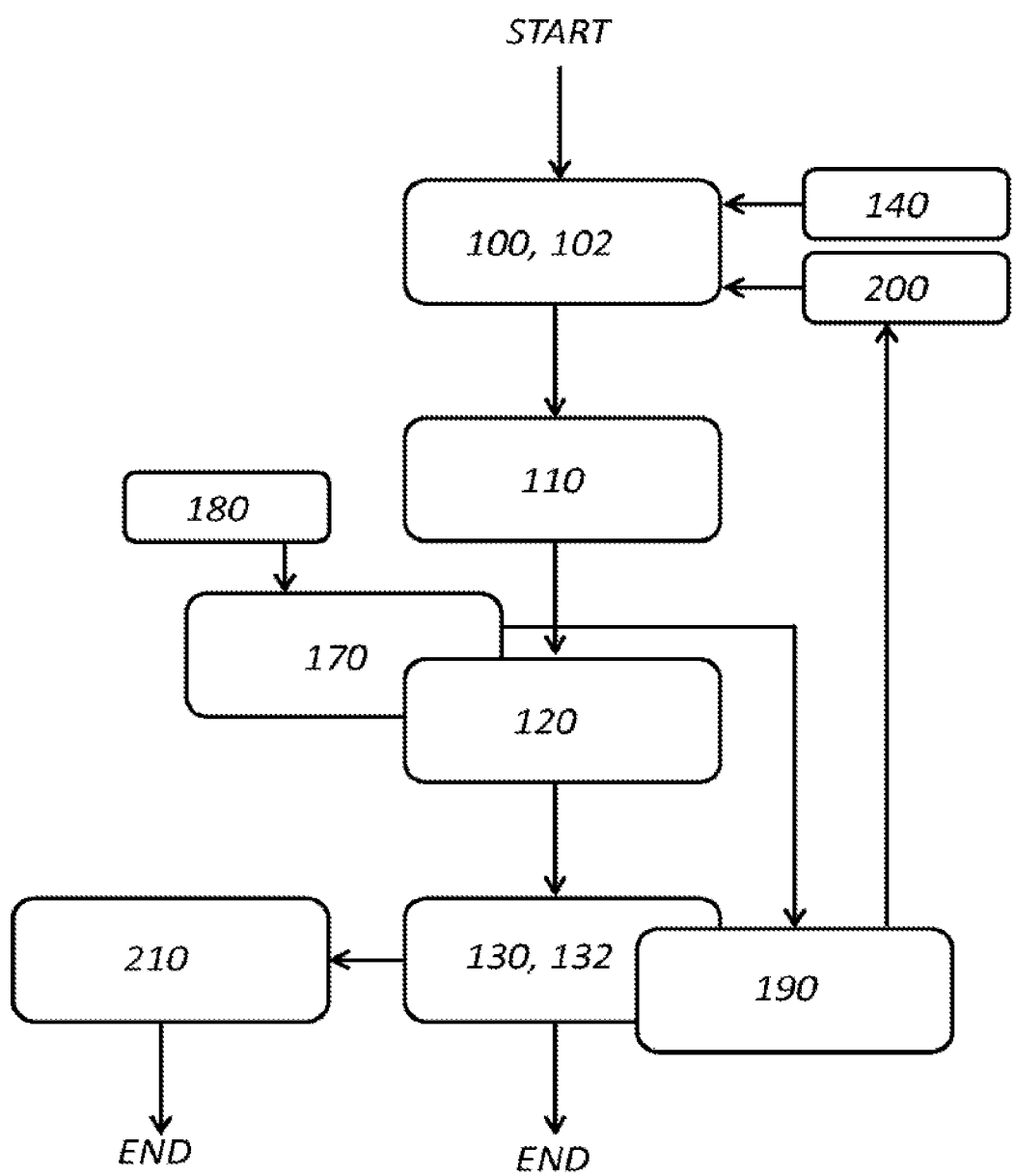
FIG. 5 shows a flow chart disclosing the steps performed when executing yet an exemplary embodiment of a method for on-board diagnostics of a turbocharger system according to the invention.

FIG. 5 shows a flow chart disclosing the steps performed when executing yet an exemplary embodiment of a method for on-board diagnostics according to the invention. The different steps of the method are visualized by boxes in the flow chart. The embodiment of a method according to FIG. 5 comprises the steps of:
100 injecting a test pulse of pressurized gas from the pressurized gas reservoir 6 to drive the turbocharger turbine 5 by means of controlling the valve 7,
110 detecting impact of injected pressurized gas on the turbocharger turbine 5 by means of the sensor 8,
120 collecting data from the sensor 8, and
130 evaluating an operational response of the turbocharger turbine 5 as a result of the injected test pulse of pressurized gas, based on the collected data.

The method step of injecting a test pulse 100 is performed by means of 140 input of characteristics of the test pulse. The method further comprises the step of:
170 collecting data regarding ambient temperature by means of 180 input of ambient temperature, measured by means of an ambient temperature sensor.

If the ambient temperature is equal to or below 0 degrees Celsius, the method further comprises the method step of:
190 determining that there is risk of freezing.

In FIG. 5 the method step of collecting data regarding ambient temperature 170 is depicted as being performed in connection to the method step of 120 collecting data from the sensor 8 and the method step of 190 determining that there is risk of freezing is depicted as being performed in connection to the method step of 130 evaluating an operational response of the turbocharger turbine 5. This is however not to be seen as limiting for the invention. Both the method step of collecting data regarding ambient temperature 170 and the step of 190 determining that there is risk of freezing may be performed continuously, simultaneously as any other step of the method or at a different interval than the other steps of the method. The more often either of the method steps are performed the better is probably the prediction of that the system may be frozen.

According to yet an embodiment of the present invention, if it has been determined that there is risk of freezing the method comprises the steps of:
102 injecting a test pulse being equal to or longer than a predicted turbocharger start-up pulse,
110 detecting impact of injected pressurized gas on the turbocharger turbine 5 by means of the sensor 8,
120 collecting data from the sensor 8, and
132 evaluating the operational response of the turbocharger turbine 5 as a result of the injected test pulse,
wherein if the there is no operational response the method comprises the further comprises the step of;
210 determining that the turbocharger system 1 is frozen.

The method step of 102 injecting a test pulse being equal to or longer than a predicted turbocharger start-up pulse is performed by means of 200 input of characteristics of a predicted turbocharger start-up pulse.

By injecting a test pulse which with certainty is known to give turbocharger turbine 5 response it can be determined that if still no response is obtained something is wrong with the turbocharger system 1. If knowledge thereof coincides with knowledge of that there is risk of freezing of the turbocharger system 1 it can be determined that the system is frozen. Knowing that the system is frozen is important information in order for the control unit 10 to optimize usage of the turbocharger system 1. Activating the turbocharger system 1 when the system is frozen may damage components of the combustion engine 4 or turbocharger system 1 or may result in that a completely different transient response is obtained than what is expected which may affect as well driveability as safety.

Although FIGS. 3 to 5 show a specific order of the method steps, the order of the steps may differ from what is depicted and various method steps may be performed simultaneously or partially simultaneously.

When herein referring to a control unit what is considered is a device capable of performing calculations, executing methods and performing operations. The control unit may for example be a general-purpose processor, an application specific processor, a circuit containing processing components, a group of distributed processing components or a group of distributed computers devices. The control unit may be a part of a larger unit capable of controlling also other devices and functionalities. The control unit may be configured to control the devices and the functionalities explicitly stated herein, but is not limited to only controlling those devices and/or functionalities. In addition to the components and/or devices the control unit explicitly is connected to the control unit may also be connected to other components and/or devices.

It is to be understood that the present invention is not limited to the embodiments described above and illustrated in the drawings; rather, the skilled person will recognize that many changes and modifications may be made within the scope of the appended claims. Thus, variations to the disclosed embodiments can be understood and effected by the skilled addressee in practicing the claimed disclosure, from a study of the drawings, the disclosure, and the appended claims.

The invention claimed is:

1. A method for on-board diagnostics of a turbocharger system for a vehicle, the turbocharger system being fluidly connected to an exhaust manifold of a combustion engine, wherein the turbocharger system comprises:
    a turbocharger turbine operable by exhaust gases from the exhaust manifold,
    a pressurized gas reservoir being fluidly connectable to the turbocharger turbine,
    a valve configured to control flow of pressurized gas from the pressurized gas reservoir to the turbocharger turbine, and
    a sensor,
wherein the method comprises the steps of
    injecting a test pulse of pressurized gas from the pressurized gas reservoir to drive the turbocharger turbine by means of controlling the valve,
    measuring movement of the turbocharger turbine caused by the injected pressurized gas directly with the sensor,
    collecting data from the sensor, and
evaluating an operational response of the turbocharger turbine as a result of the injected test pulse of pressurized gas, based on the collected data, wherein evaluating the operational response of the turbocharger turbine comprises the further step of
    determining that the evaluated operational response of the turbocharger turbine indicates no, by the sensor, measurable response of the turbocharger turbine as the result of the injected test pulse,
    injecting a further pulse of pressurized gas from the pressurized gas reservoir to drive the turbocharger turbine, wherein the further pulse is longer than the previous pulse,
    measuring movement of the turbocharger turbine caused by the injected pressurized gas directly with the sensor, and
    collecting data from the sensor,
    evaluating the operational response of the turbocharger turbine as a result of the injected further pulse of pressurized gas based on the collected data, wherein the further steps of the method are repeated until the evaluated operational response of the turbocharger turbine indicates, by the sensor measurable, response of the turbocharger turbine as the result of the injected further pulse.

2. A method according to claim 1, wherein the step of evaluating the operational response of the turbocharger turbine comprises the further step of
    comparing the data collected after the test pulse has been injected to data collected before the test pulse is injected.

3. A method according to claim 1, wherein the further step of
    determining a current delay time,
wherein delay time is defined as the maximum time from activating the step of injecting the test pulse or further pulse to de-activating the step of injecting the test pulse or further pulse without measurable response.

4. A method according to claim 3, wherein the further steps of when a current delay time has been determined,
    injecting a control pulse of pressurized gas from the pressurized gas reservoir to drive the turbocharger turbine, wherein the control pulse is longer than the current delay time,
    measuring movement of the turbocharger turbine caused by the injected pressurized gas with the sensor,
    collecting data from the sensor, and
    evaluating if the operational response as a result of the injected control pulse indicates that the turbocharger system operates as expected.

5. A method according to claim 3, wherein the further step of
    storing current delay time as a stored system delay time, whereby stored system delay time is used to optimize operation of the turbocharger system.

6. A method according to claim 5, wherein the further step of
    correlating and storing the stored system delay time together with additional operating and/or environmental parameters.

7. A method according to claim 1, wherein each further pulse is between 0.05 and 0.15 seconds longer than the previous pulse.

8. A method according to claim 1, wherein the further step of
    collecting data regarding ambient temperature by means of an ambient temperature sensor,
wherein if the ambient temperature is equal to or below 0 degrees Celsius, the method comprises the further step of
    determining that there is risk of freezing.

9. A method according to claim 8, wherein if it has been determined that there is risk of freezing the method comprises the further steps of injecting a test pulse being equal to or longer than a predicted turbocharger start-up pulse, and
    evaluating the operational response of the turbocharger turbine as a result of the injected test pulse,
wherein if the there is no operational response the method comprises the further step of,
    determining that the turbocharger system is frozen.

10. A method according to claim 1, wherein the method for on-board diagnostics is performed when the combustion engine is in operation.

11. A method according to claim 1, wherein the method for on-board diagnostics is performed when the combustion engine is not in operation.

12. A method according to claim 1, wherein the test pulse is 0.01 to 0.3 seconds long.

13. A method according to claim 1, wherein the method steps are performed by a control unit.

14. A computer readable medium carrying a computer program comprising program code for performing the steps of claim 1 when said program code is run on a computer.

15. A control unit for controlling a method for on-board diagnostics, the control unit being configured to perform the steps of the method according to claim 1.

\* \* \* \* \*